United States Patent
Null et al.

[11] Patent Number: 5,947,495
[45] Date of Patent: Sep. 7, 1999

[54] ALL-TERRAIN SKATEBOARD

[76] Inventors: Lance Ludgay Null, 8842 N. Ave., Hanford, Calif. 93230; Christopher A. Pincetich, 3950 Bramble La., Unit D, Santa Cruz, Calif. 95062

[21] Appl. No.: 08/988,649

[22] Filed: Dec. 11, 1997

[51] Int. Cl.$^6$ .................................................. B60G 7/00
[52] U.S. Cl. ............................... 280/87.042; 280/87.01
[58] Field of Search ................ 280/87.042, 87.041, 280/87.01, 14.2

[56] References Cited

U.S. PATENT DOCUMENTS

| | | | |
|---|---|---|---|
| 1,468,173 | 10/1923 | Shaw | 280/87.01 |
| 3,854,743 | 12/1974 | Hansen | 280/11.3 |
| 4,062,557 | 12/1977 | Roden | 280/87.04 |
| 4,337,961 | 7/1982 | Covert et al. | 280/87.04 |
| 5,020,621 | 6/1991 | Martin | 280/87.042 |
| 5,022,668 | 6/1991 | Kenny | 280/87.042 |
| 5,114,166 | 5/1992 | McCosker | 280/87.042 |
| 5,127,672 | 7/1992 | Horibata | 280/842 |
| 5,280,930 | 1/1994 | Smathers et al. | 280/11.2 |
| 5,351,974 | 10/1994 | Cech | 280/11.2 |
| 5,362,087 | 11/1994 | Agid | 280/611 |

*Primary Examiner*—J. J. Swann
*Assistant Examiner*—James S. McClellan

[57] ABSTRACT

A new All-Terrain Skateboard for providing a skateboard that can be used for off-road conditions. The inventive device includes a deck, a front wheel unit disposed below the deck towards one end thereof, and a rear wheel unit disposed below the deck towards an opposite end thereof. A front suspension system and a rear suspension system each mount the front wheel unit and the rear wheel unit, respectively, to an underside of the deck wherein the front suspension system and the rear suspension system permit the front wheel unit and the rear wheel unit, respectively, to independently pivot forwards and backwards and side to side relative to the deck.

20 Claims, 4 Drawing Sheets

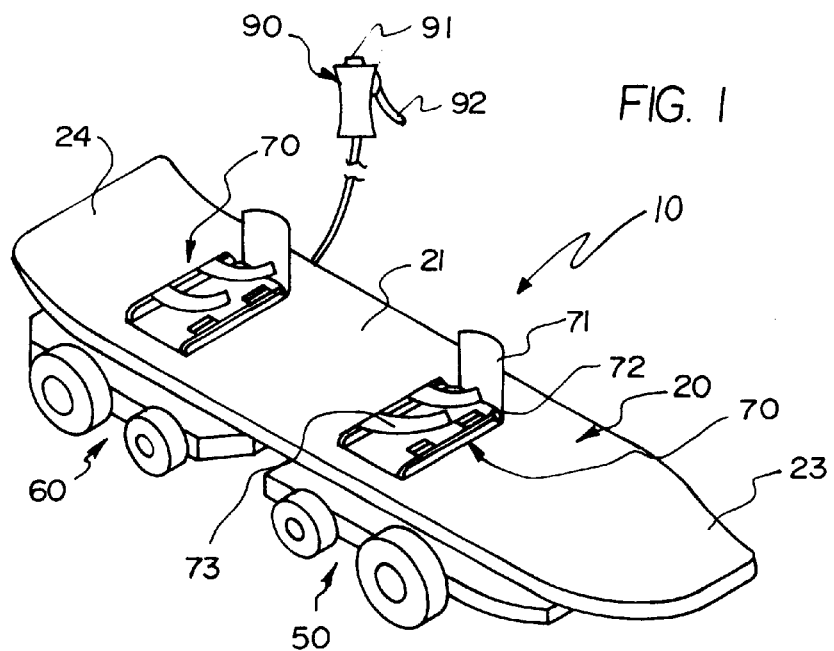
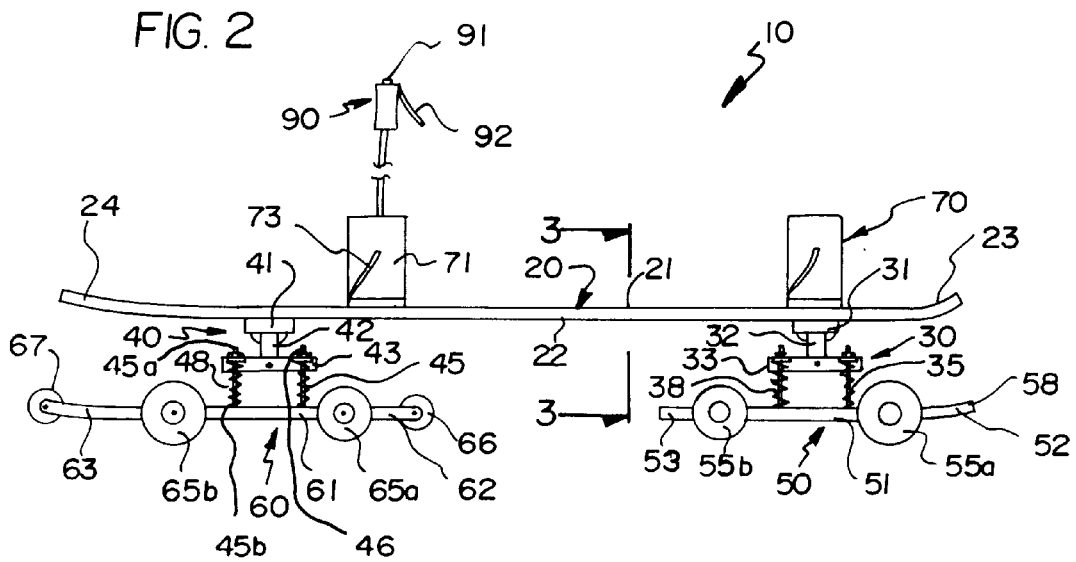

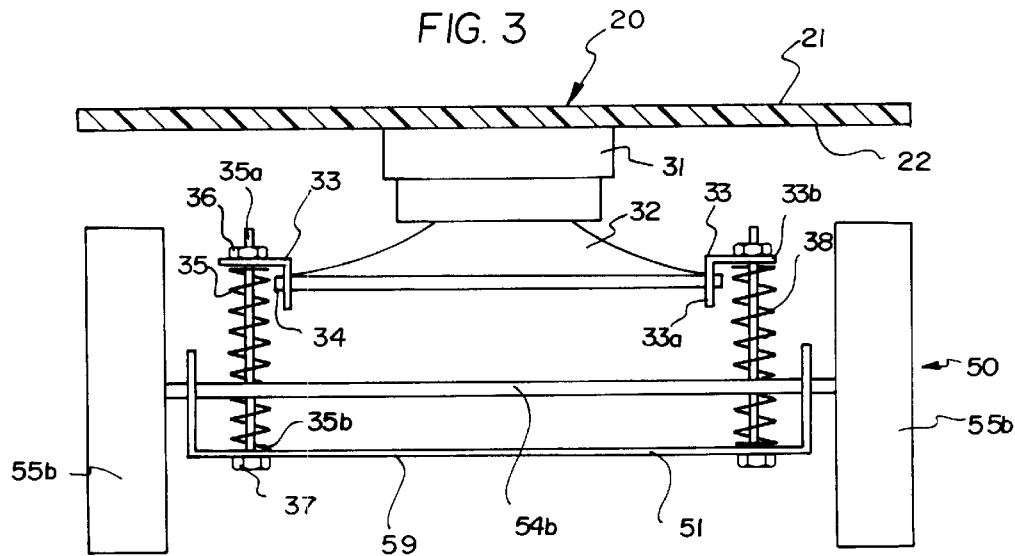
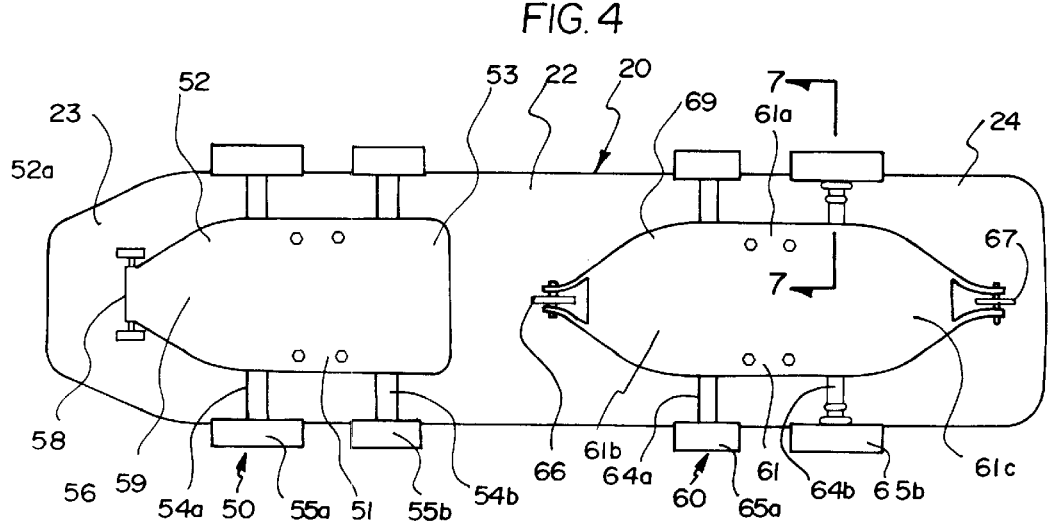

ALL-TERRAIN SKATEBOARD

BACKGROUND OF THE INVENTION

1. Field of the Invention

The present invention relates to skateboards and more particularly pertains to a new All-Terrain Skateboard for providing a skateboard that can be used for off-road conditions.

2. Description of the Prior Art

The use of skateboards is known in the prior art. More specifically, skateboards heretofore devised and utilized are known to consist basically of familiar, expected and obvious structural configurations, notwithstanding the myriad of designs encompassed by the crowded prior art which have been developed for the fulfillment of countless objectives and requirements.

Known prior art skateboards include U.S. Pat. No. 5,310, 202; U.S. Pat. No. 5,224,719; U.S. Pat. No. 5,100,161; U.S. Pat. No. 4,181,316; U.S. Pat. No. D246,065; and U.S. Pat. No. 4,040,639.

While these devices fulfill their respective, particular objectives and requirements, the aforementioned patents do not disclose a new All-Terrain Skateboard. The inventive device includes a deck, a front wheel unit disposed below the deck towards one end thereof, and a rear wheel unit disposed below the deck towards an opposite end thereof. A front suspension system and a rear suspension system each mount the front wheel unit and the rear wheel unit, respectively, to an underside of the deck wherein the front suspension system and the rear suspension system permit the front wheel unit and the rear wheel unit, respectively, to independently pivot forwards and backwards and side to side relative to the deck.

In these respects, the All-Terrain Skateboard according to the present invention substantially departs from the conventional concepts and designs of the prior art, and in so doing provides an apparatus primarily developed for the purpose of providing a skateboard that can be used for off-road conditions.

SUMMARY OF THE INVENTION

In view of the foregoing disadvantages inherent in the known types of skateboards now present in the prior art, the present invention provides a new All-Terrain Skateboard construction wherein the same can be utilized for providing a skateboard that can be used for off-road conditions.

The general purpose of the present invention, which will be described subsequently in greater detail, is to provide a new All-Terrain Skateboard apparatus and method which has many of the advantages of the skateboards mentioned heretofore and many novel features that result in a new All-Terrain Skateboard which is not anticipated, rendered obvious, suggested, or even implied by any of the prior art skateboards, either alone or in any combination thereof.

To attain this, the present invention generally comprises a deck, a front wheel unit disposed below the deck towards one end thereof, and a rear wheel unit disposed below the deck towards an opposite end thereof. A front suspension system and a rear suspension system each mount the front wheel unit and the rear wheel unit, respectively, to an underside of the deck wherein the front suspension system and the rear suspension system permit the front wheel unit and the rear wheel unit, respectively, to independently pivot forwards and backwards and side to side relative to the deck.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new All-Terrain Skateboard apparatus and method which has many of the advantages of the skateboards mentioned heretofore and many novel features that result in a new All-Terrain Skateboard which is not anticipated, rendered obvious, suggested, or even implied by any of the prior art skateboards, either alone or in any combination thereof.

It is another object of the present invention to provide a new All-Terrain Skateboard which may be easily and efficiently manufactured and marketed.

It is a further object of the present invention to provide a new All-Terrain Skateboard which is of a durable and reliable construction.

An even further object of the present invention is to provide a new All-Terrain Skateboard which is susceptible of a low cost of manufacture with regard to both materials and labor, and which accordingly is then susceptible of low prices of sale to the consuming public, thereby making such All-Terrain Skateboard economically available to the buying public.

Still yet another object of the present invention is to provide a new All-Terrain Skateboard which provides in the apparatuses and methods of the prior art some of the advantages thereof, while simultaneously overcoming some of the disadvantages normally associated therewith.

Still another object of the present invention is to provide a new All-Terrain Skateboard for providing a skateboard that can be used for off-road conditions.

Yet another object of the present invention is to provide a new All-Terrain Skateboard which includes a deck, a front wheel unit disposed below the deck towards one end thereof, and a rear wheel unit disposed below the deck towards an opposite end thereof. A front suspension system and a rear suspension system each mount the front wheel unit and the rear wheel unit, respectively, to an underside of the deck wherein the front suspension system and the rear suspension system permit the front wheel unit and the rear wheel unit, respectively, to independently pivot forwards and backwards and side to side relative to the deck.

Still yet another object of the present invention is to provide a new All-Terrain Skateboard that would allow a rider to traverse rough and uneven terrain including grass, dirt, small rocks, and the like.

Even still another object of the present invention is to provide a new All-Terrain Skateboard that would incorporate a suspension system which would smooth out bumps and allow for greater control in off-road conditions.

Even still another object of the present invention is to provide a new All-Terrain Skateboard that would give the rider the feel of riding a snowboard on dry land.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of a new All-Terrain Skateboard according to the present invention.

FIG. 2 is a side elevation view thereof.

FIG. 3 is a rear elevation view of the front chassis of the present invention from the perspective of line 3—3 of FIG. 2.

FIG. 4 is a bottom view of the present invention.

DESCRIPTION OF THE PREFERRED EMBODIMENT

Figure 5:
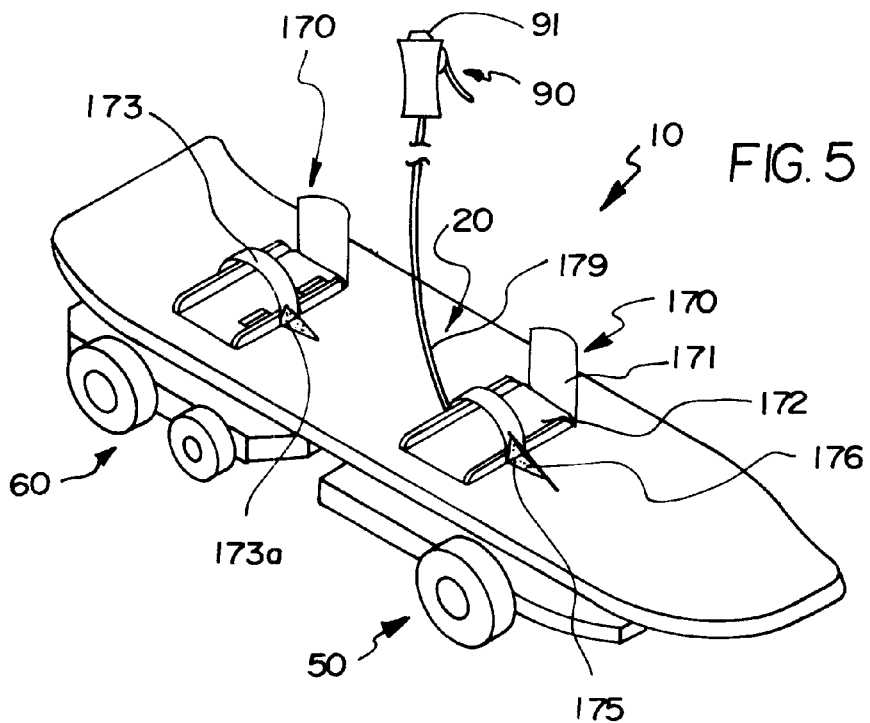
FIG. 5 is an illustration of the present invention with a second embodiment of the bindings provided thereon.

With reference now to the drawings, and in particular to FIGS. 1 through 8 thereof, a new All-Terrain Skateboard embodying the principles and concepts of the present invention and generally designated by the reference numeral 10 will be described.

As best illustrated in FIGS. 1 through 8, the All-Terrain Skateboard 10 comprises a deck 20, a front wheel unit 50 disposed below the deck 20 towards one end thereof, and a rear wheel unit 60 disposed below the deck 20 towards an opposite end thereof. A front suspension system 30 and a rear suspension system 40 each mount the front wheel unit 50 and the rear wheel unit 60, respectively, to an underside of the deck 20 wherein the front suspension system 30 and the rear suspension system 40 permit the front wheel unit 50 and the rear wheel unit 60, respectively, to independently pivot forwards and backwards and side to side relative to the deck 20.

As best illustrated in FIGS. 1 through 4, the deck 20 has a top surface 21, on which a rider is supported, and a bottom surface 22, presented toward the terrain. The deck 20 includes a nose section 23 at one end and a tail section 24 at an opposite end. The nose section 23 and the tail section 24 are each curved slightly upward. Preferably, the deck 20 is similar to a snowboard wherein, in an illustrative embodiment, the deck 20 measures about 25 inches long by about 10½ inches wide by about ½ inch in thickness.

The front wheel unit 50 and the rear wheel unit 60 each include a chassis 51 and 61, respectively, a wheel axle 54 and 64, respectively, transversely mounted to each chassis 51 and 61, respectively, and a pair of wheels 55 and 65, respectively, each rotatably mounted to opposite ends of each wheel axle 54 and 64, respectively. Preferably, each of the wheels include pneumatic tires which are mounted on rims including sealed roller bearings. In addition, each chassis 51 and 61, respectively, includes a skid plate 59 and 69, respectively, secured to the underside thereof wherein the skid plate 59 and 69, respectively, helps guide each chassis 51 and 61, respectively, over obstacles.

It is contemplated that multiple axles and multiple pairs of wheels may be mounted to one chassis. In a preferred embodiment, the front wheel unit 50 includes two pairs of wheels. As such, the front wheel unit 50 includes a front chassis 51 having a leading end 52 and a trailing end 53, a first front wheel axle 54a transversely mounted to the front chassis 51 towards the leading end 52 thereof, and a second front wheel axle 54b transversely mounted to the front chassis 51 towards the trailing end 53 thereof in spaced, parallel relation to the first front wheel axle 54a. Accordingly, a first pair of front wheels 55a are each rotatably mounted to opposite ends of the first front wheel axle 54a and a second pair of front wheels 55b are each rotatably mounted to opposite ends of the second front wheel axle 54b. In an illustrative embodiment, each of the first pair of front wheels 55a have an outer diameter of about 8 inches and each of the second pair of front wheels 55b have an outer diameter of about 5¾ inches. In an optional embodiment, the front wheel unit 50 includes one pair of wheels (FIG. 5).

The front chassis 51 is generally rectangular in shape and includes a generally semi-hexagonal leading edge 52a at the leading end 52 thereof. A ramming member 58 is secured along the leading edge 52a so as to assist in guiding the front chassis 51 over obstacles. In an optional embodiment, a pair of spaced guide wheels 56 are each rotatably mounted to the front chassis 51 at the leading end 52 thereof so as to also assist in guiding the front chassis 51 over obstacles.

In a preferred embodiment, the rear wheel unit 60 also includes two pairs of wheels. As such, the rear wheel unit 60 includes a rear chassis 61 having a leading end 62 and a trailing end 63, a first rear wheel axle 64a transversely mounted to the rear chassis 61 towards the leading end 62 thereof, and a second rear wheel axle 64b transversely mounted to the rear chassis 61 towards the trailing end 63 thereof in spaced, parallel relation to the first rear wheel axle 64a. Accordingly, a first pair of rear wheels 65a are each rotatably mounted to opposite ends of the first rear wheel axle 64a and a second pair of rear wheels 65b are each rotatably mounted to opposite ends of the second rear wheel axle 64b. In an illustrative embodiment, each of the first pair of rear wheels 65a have an outer diameter of about 5¾ inches and each of the second pair of rear wheels 65b have an outer diameter of about 6 inches.

The rear chassis 61 includes a rectangular portion 61a, a first triangular portion 61b at the leading end 62 and a second triangular portion 61c at the trailing end 63. In an optional embodiment, a first guide wheel 66 is rotatably mounted to the first triangular portion 61b of the rear chassis 61 at the leading end 62 thereof and a second guide wheel 67 is rotatably mounted to the second triangular portion 61c of the rear chassis 61 at the trailing end 63 thereof. The first guide wheel 66 and the second guide wheel 67 assist in guiding the rear chassis 61 over obstacles. Preferably, the first guide wheel 66 and the second guide wheel 67 are each centrally mounted at the leading end 62 and the trailing end 63, respectively, of the rear chassis 61.

The front suspension system 30 is mounted to the bottom surface 22 of the deck 20 adjacent the nose section 23 thereof and the rear suspension system 40 is mounted to the bottom surface 22 of the deck 20 adjacent the tail section 24 thereof. The front suspension system 30 and the rear suspension system 40 each include a riser pad 31 and 41, respectively, mounted to the bottom surface 22 of the deck 20, a truck 32 and 42, respectively, secured to an underside of each riser pad 31 and 41, respectively, and a pair of mounting brackets 33 and 43, respectively, each pivotally mounted to opposite sides of each truck 32 and 42, respectively, by a pivot pin 34, respectively, transversely extending through each truck 32 and 42, respectively. In addition, a pair of upright supports 35 and 45, respectively, each interconnect one of the pair of mounting brackets 33 and 43, respectively, and the chassis 51 and 61, respectively, of one of the wheel units 50 and 60, respectively (either the front wheel unit or the rear wheel unit). Furthermore, a helical compression spring 38 and 48, respectively, is disposed around each of the upright supports 35 and 45, respectively, and interposed between the mounting bracket 33 and 43, respectively, and the chassis 51 and 61, respectively. As such, each wheel unit 50 and 60 may be pivoted forwards and backwards and side to side relative to the deck 20.

In a preferred embodiment, each of the mounting brackets 33 and 43, respectively, are L-shaped and, as such, include a first leg 33a, (not shown), respectively, and a second leg 33b, (not shown), respectively. In addition, each of the mounting brackets 33 and 43, respectively, have a forward end and a rearward end. The first leg 33a, (not shown), respectively, abuts the truck 32 and 42, respectively, and, therefore, has a first hole therethrough sized for receiving the pivot pin 34 and 44, respectively. Preferably, the first hole is provided intermediate the forward end and the rearward end.

Each of the upright supports 35 and 45, respectively, have an upper end 35a and 45a, respectively, and a lower end 35b and 45b, respectively. As such, each of the upright supports 35 and 45, respectively, are slidably coupled at the upper end 35a and 45a, respectively, thereof to the second leg 33b and 43b, respectively, of one of the mounting brackets 33 and 43, respectively, and slidably coupled at the lower end 35b and 45b, respectively, thereof to the chassis 51 and 61, respectively, of one of the wheel units 50 and 60, respectively. Accordingly, each of the upright supports 35 and 45, respectively, include an upper collar 36 and 46, respectively, at the upper end 35a and 45a, respectively, thereof and a lower collar 37, (not shown), respectively, at the lower end 35b and 45b, respectively, thereof. As such, the upper collar 36 and 46, respectively, couples each of the upright supports 35 and 45, respectively, to one of the mounting brackets 33 and 43, respectively, and the lower collar 37 and 47, respectively, couples each of the upright supports 35 and 45, respectively, to one of the wheel units 50 and 60, respectively. In an illustrative embodiment, each lower collar 37 and 47, respectively, is a head of a bolt and each upper collar 36 and 46, respectively, is a nut coupled to the end of the bolt.

In a preferred embodiment, the front suspension system 30 and the rear suspension system 40 each include two pairs of upright supports 35 and 45, respectively. As such, a first pair of upright supports interconnect the forward end of each of the mounting brackets 33 and 43, respectively, and the chassis 51 and 61, respectively, of one of the wheel units 50 and 60, respectively, and a second pair of upright supports interconnect the rearward end of each of the mounting brackets 33 and 43, respectively, and the chassis 51 and 61, respectively. Accordingly, one of the first pair of upright supports is slidably fitted through a hole provided in the second leg of one of the mounting brackets adjacent the forward end thereof and the other upright support is slidably fitted through a hole provided in the second leg of the other mounting bracket adjacent the forward end thereof. Furthermore, one of the second pair of upright supports is slidably fitted through a hole provided in the second leg of one of the mounting brackets adjacent the rearward end thereof and the other upright support is slidably fitted through a hole provided in the second leg of the other mounting bracket adjacent the rearward end thereof.

In a preferred embodiment, a pair of bindings 70 are mounted in spaced relation on the top surface 21 of the deck 20 (FIG. 1). Each of the bindings 70 include a calf support 71 and a heel support 72 and are adapted for securing a foot of the rider to the deck 20. As such, each of the bindings 70 include adjustable straps 73 for use in securing the foot of the rider therein.

Figure 6:
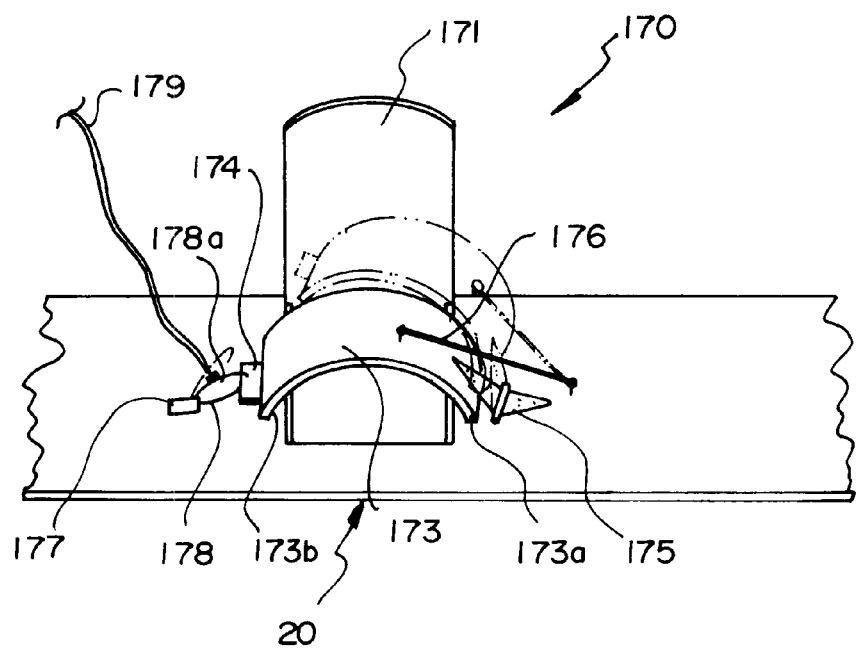
FIG. 6 is a front view of the remote releasable bindings of the present invention.

In an optional embodiment, a pair of remote release bindings 170 are mounted in spaced relation on the top surface 21 of the deck 20 (FIGS. 5 and 6). Each of the remote release bindings 170 include a calf support 171 and a heel support 172 and are adapted for releasably securing a foot of the rider to the deck 20. As such, each of the remote release bindings 170 include a releasable foot plate 173. The releasable foot plate 173 is generally semi-circular in shape and has a first end 173a and a second end 173b wherein the first end 173a of the releasable foot plate 173 is hingedly coupled to the deck 20 by a hinge 175.

The releasable foot plate 173 is pivotable between an open position wherein the rider may remove his or her foot from the remote release binding 170 and a closed position wherein the releasable foot plate 173 overlays the top of the foot of the rider. Accordingly, in the closed position, the foot of the rider is captured between the releasable foot plate 173 and the top surface 21 of the deck 20. The releasable foot plate 173 is biased to the open position by a resilient member 176. Accordingly, the resilient member 176 is connected at one end to the releasable foot plate 173 and connected at an opposite end to the top surface 21 of the deck 20 so as to pull the releasable foot plate 173 to the open position. In a preferred embodiment, the resilient member 176 is an elastic band.

The releasable foot plate 173 is retained in the closed position by a securing clip 177. The securing clip 177 is mounted on the top surface 21 of the deck 20 and includes a pair of interlocking fingers 178 wherein one of the interlocking fingers 178 is a retractable finger 178a. The securing clip 177 is mounted so as to be adjacent the second end 173b of the releasable foot plate 173 when in the closed position. As such, the pair of interlocking fingers 178 are adapted for capturing a retention loop 174 provided on the releasable foot plate 173 adjacent the second end 173b thereof. A release wire 179 is operably connected to the retractable finger 178a whereby actuating the release wire 179 retracts the retractable finger 178a and thereby releases the releasable foot plate 173. Actuation of the release wire 179 is controlled by a binding release button 91 provided on a hand-held control 90. As such, the rider presses the binding release button 91 to release the releasable foot plate 173. Utilizing wireless technology, the releasable foot plate 173 may be released electronically with a wireless remote hand-held control.

Figure 7:
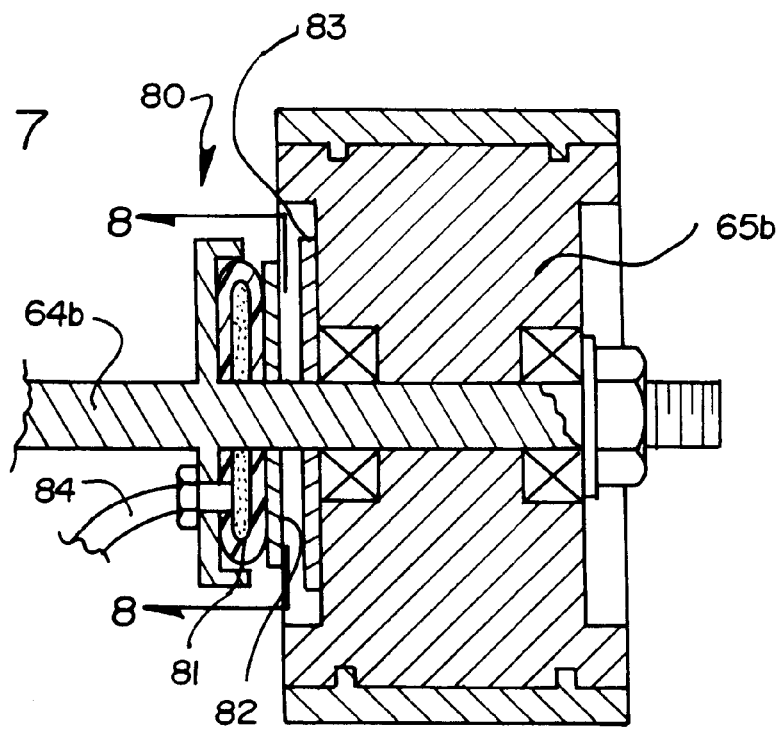
FIG. 7 is a cross sectional view of the braking system of the present invention taken along line 7—7 of FIG. 4.
Figure 8:
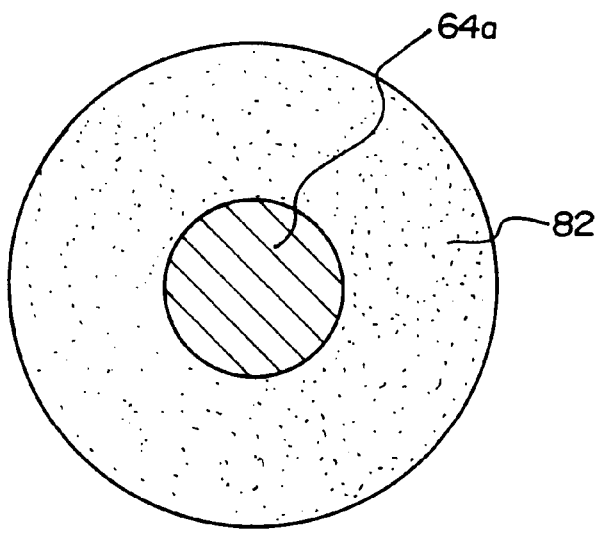
FIG. 8 is an illustration of the braking pad of the present invention.

In an optional embodiment, a braking system 80 is provided (FIGS. 7 and 8). Preferably, the braking system 80 is a hydraulically operated system and includes an expandable chamber 81 mounted to the wheel axle 64 adjacent one of the wheels 65. A first brake pad 82 is provided on an outermost surface of the expandable chamber 81 and a second brake pad 83 is provided on an innermost surface of one of the wheels 65 wherein the expandable chamber 81 expands and the first brake pad 82 acts upon the second brake pad 83 for braking when hydraulic fluid is introduced into the expandable chamber 81. Actuation of the braking system 80 is controlled by a brake lever 92 operably coupled to the hand-held control 90. As such, the rider squeezes the brake lever 92 and forces hydraulic fluid through a hose 84 which communicates with the expandable chamber 81 so as to actuate the braking system 80.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An all-terrain skateboard, comprising:
   a deck having a top surface and a bottom surface;
   a front wheel unit disposed below said deck towards one end thereof;
   a rear wheel unit disposed below said deck towards an opposite end thereof;
   a front suspension system mounting said front wheel unit to said bottom surface of said deck, said front suspension system permitting said front wheel unit to pivot forwards and backwards and side to side relative to said deck;
   a rear suspension system mounting said rear wheel unit to said bottom surface of said deck, said rear suspension system permitting said rear wheel unit to pivot forwards and backwards and side to side relative to said deck;
   a pair of remote release bindings mounted in spaced relation on said top surface of said deck, each of said pair of remote release bindings being adapted for releasably securing a foot of a rider to said deck;
   wherein each of said pair of remote release bindings has a releasable foot plate adapted for selectively overlaying a foot of a rider for holding said foot to said deck when in a closed orientation; and
   a biasing means for biasing said releasable foot plate towards an open position.

2. The all-terrain skateboard of claim 1, wherein said front wheel unit and said rear wheel unit each include a chassis, a wheel axle transversely mounted to said chassis, and a pair of wheels each rotatably mounted to opposite ends of said wheel axle.

3. The all-terrain skateboard of claim 2, wherein
   said front wheel unit includes one of one pair of wheels and two pairs of wheels, and wherein
   said rear wheel unit includes two pairs of wheels.

4. The all-terrain skateboard of claim 1, wherein said front wheel unit comprises:
   a front chassis having a leading end and a trailing end,
   a first front wheel axle transversely mounted to said front chassis towards said leading end thereof, and
   a first pair of front wheels each rotatably mounted to opposite ends of said first front wheel axle.

5. The all-terrain skateboard of claim 4, wherein said front wheel unit further comprises:
   a second front wheel axle transversely mounted to said front chassis towards said trailing end thereof in spaced, parallel relation to said first front wheel axle, and
   a second pair of front wheels each rotatably mounted to opposite ends of said second front wheel axle.

6. The all-terrain skateboard of claim 1, wherein said rear wheel unit comprises:
   a rear chassis having a leading end and a trailing end,
   a first rear wheel axle transversely mounted to said rear chassis towards said leading end thereof,
   a second rear wheel axle transversely mounted to said rear chassis towards said trailing end thereof in spaced, parallel relation to said first rear wheel axle,
   a first pair of rear wheels each rotatably mounted to opposite ends of said first rear wheel axle, and
   a second pair of rear wheels each rotatably mounted to opposite ends of said second rear wheel axle.

7. The all-terrain skateboard of claim 2, wherein said front suspension system and said rear suspension system each comprise:
   a riser pad mounted to said bottom surface of said deck,
   a truck secured to an underside of said riser pad,
   a pair of mounting brackets each pivotally mounted to opposite sides of said truck,
   a pair of upright supports each interconnecting one of said pair of mounting brackets and said chassis of one of said front wheel unit and said rear wheel unit, and
   a helical compression spring disposed around each of said pair of upright supports and interposed between one of said pair of mounting brackets and said chassis of one of said front wheel unit and said rear wheel unit.

8. The all-terrain skateboard of claim 7, wherein
   each of said mounting brackets are L-shaped and have a first leg and a second leg, said first leg being generally vertically oriented and adjacent said truck, said second leg being generally horizontally oriented and extending outward from said truck, and wherein each of said pair of upright supports have an upper end and a lower end, each of said pair of upright supports being slidably coupled at said upper end thereof to said second leg of one of said pair of mounting brackets and being slidably coupled at said lower end thereof to said chassis of one of said front wheel unit and said rear wheel unit.

9. The all-terrain skateboard of claim 7, wherein said front suspension system and said rear suspension system each include two pairs of upright supports comprising a first pair of upright supports and a second pair of upright supports, said first pair of upright supports interconnecting one end of each of said pair of mounting brackets and said chassis of one of said front wheel unit and said rear wheel unit, and said second pair of upright supports interconnecting an opposite end of each of said pair of mounting brackets and said chassis of one of said front wheel unit and said rear wheel unit.

10. The all-terrain skateboard of claim 1, further comprising:
a pair of bindings mounted in spaced relation on said top surface of said deck, each of said pair of bindings being adapted for securing a foot of a rider to said deck.

11. The all-terrain skateboard of claim 10, wherein each of said pair of bindings include a heel support, a calf support extending upward from said heel support, and an adjustable strap adapted for use in securing said foot of said rider therein.

12. The all-terrain skateboard of claim 1, further comprising:
a pair of remote release bindings mounted in spaced relation on said top surface of said deck, each of said pair of remote release bindings being adapted for releasably securing a foot of a rider to said deck.

13. The all-terrain skateboard of claim 12, wherein each of said pair of remote release bindings include a heel support, a calf support extending upward from said heel support, and a releasable foot plate,
said releasable foot plate being generally arched and having a first end hingedly coupled to said top surface of said deck and a second end, said releasable foot plate pivotable between a closed position wherein said releasable foot plate overlays said foot of said rider whereby said foot of said rider is captured between said releasable foot plate and said top surface of said deck and an open position wherein said releasable foot plate is pivoted above and away from said foot of said rider whereby said rider may remove said foot from said remote release binding.

14. The all-terrain skateboard of claim 13, further comprising:
a releasable retention means for releasably retaining said releasable foot plate in said closed position.

15. The all-terrain skateboard of claim 2, further comprising:
a hydraulically operated braking system including an expandable chamber mounted to said wheel axle adjacent one of said pair of wheels, a first brake pad provided on an outermost surface of said expandable chamber, and a second brake pad provided on an innermost surface of said one of said pair of wheels wherein said expandable chamber expands and said first brake pad acts upon said second brake pad for braking when hydraulic fluid is introduced into said expandable chamber.

16. The all-terrain skateboard of claim 15, further comprising:
a hand-held control, said hand-held control including a brake lever operably connected to said braking system whereby actuating said brake lever actuates said braking system.

17. An all-terrain skateboard, comprising:
a deck having a top surface and a bottom surface;
a front wheel unit disposed below said deck towards one end thereof;
a rear wheel unit disposed below said deck towards an opposite end thereof;
a front suspension system mounting said front wheel unit to said bottom surface of said deck, said front suspension system permitting said front wheel unit to pivot forwards and backwards and side to side relative to said deck;
a rear suspension system mounting said rear wheel unit to said bottom surface of said deck, said rear suspension system permitting said rear wheel unit to pivot forwards and backwards and side to side relative to said deck;
a pair of remote release bindings mounted in spaced relation on said top surface of said deck, each of said pair of remote release bindings being adapted for releasably securing a foot of a rider to said deck;
wherein each of said pair of remote release bindings include a heel support, a calf support extending upward from said heel support, and a releasable foot plate,
said releasable foot plate being generally arched and having a first end hingedly coupled to said top surface of said deck and a second end, said releasable foot plate pivotable between a closed position wherein said releasable foot plate overlays said foot of said rider whereby said foot of said rider is captured between said releasable foot plate and said top surface of said deck and an open position wherein said releasable foot plate is pivoted above and away from said foot of said rider whereby said rider may remove said foot from said remote release binding; and
a biasing means for biasing said releasable foot plate to said open position.

18. The all-terrain skateboard of claim 17, wherein said biasing means comprises a resilient member, said resilient member being connected at one end to said releasable foot plate and connected at an opposite end to said top surface of said deck whereby said resilient member pulls said releasable foot plate to said open position.

19. An all-terrain skateboard, comprising:
a deck having a top surface and a bottom surface;
a front wheel unit disposed below said deck towards one end thereof;
a rear wheel unit disposed below said deck towards an opposite-end thereof;
a front suspension system mounting said front wheel unit to said bottom surface of said deck, said front suspension system permitting said front wheel unit to pivot forwards and backwards and side to side relative to said deck;
a rear suspension system mounting said rear wheel unit to said bottom surface of said deck, said rear suspension system permitting said rear wheel unit to pivot forwards and backwards and side to side relative to said deck;

a pair of remote release bindings mounted in spaced relation on said top surface of said deck, each of said pair of remote release bindings being adapted for releasably securing a foot of a rider to said deck;

wherein each of said pair of remote release bindings include a heel support, a calf support extending upward from said heel support, and a releasable foot plate, said releasable foot plate being generally arched and having a first end hingedly coupled to said top surface of said deck and a second end, said releasable foot plate pivotable between a closed position wherein said releasable foot plate overlays said foot of said rider whereby said foot of said rider is captured between said releasable foot plate and said top surface of said deck and an open position wherein said releasable foot plate is pivoted above and away from said foot of said rider whereby said rider may remove said foot from said remote release binding;

a releasable retention means for releasably retaining said releasable foot plate in said closed position; and wherein said releasable foot plate includes a retention loop adjacent said second end thereof, and wherein said releasable retention means comprises:

a securing clip mounted on said top surface of said deck adjacent said second end of said releasable foot plate when in said closed position, said securing clip including a pair of interlocking fingers adapted for capturing said retention loop provided on said releasable foot plate adjacent said second end thereof, one of said pair of interlocking fingers being a retractable finger, and a release wire operably connected to said retractable finger whereby actuating said release wire retracts said retractable finger and thereby releases said releasable foot plate.

20. The all terrain skateboard of claim 19, further comprising:

a hand-held control, said hand-held control including a binding release button operably connected to said release wire whereby actuating said binding release button releases said releasable foot plate.

\* \* \* \* \*